United States Patent
Yamasaki et al.

(10) Patent No.: US 6,785,799 B1
(45) Date of Patent: Aug. 31, 2004

(54) MULTIPROCESSOR WITH ASYNCHRONOUS PIPELINE PROCESSING OF INSTRUCTIONS, AND CONTROL METHOD THEREOF

(75) Inventors: Masayuki Yamasaki, Osaka (JP); Katsuhiko Ueda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/514,204

(22) Filed: Feb. 25, 2000

(30) Foreign Application Priority Data

Feb. 26, 1999 (JP) .......................................... 11-052016

(51) Int. Cl.⁷ .......................... G06F 15/00; G06F 15/76
(52) U.S. Cl. ........................................................ 712/20
(58) Field of Search ............................ 712/20; 711/157

(56) References Cited

U.S. PATENT DOCUMENTS

| | | | | |
|---|---|---|---|---|
| 5,127,098 A | * | 6/1992 | Rosenthal et al. .......... 711/202 |
| 5,357,617 A | * | 10/1994 | Davis et al. ................. 712/245 |
| 5,412,788 A | * | 5/1995 | Collins et al. .............. 711/157 |
| 5,499,356 A | | 3/1996 | Eckert et al. |
| 5,574,871 A | * | 11/1996 | Hoyt et al. .................. 712/200 |
| 5,611,075 A | * | 3/1997 | Garde ......................... 711/153 |
| 5,729,727 A | * | 3/1998 | Suzuki ....................... 712/233 |
| 5,787,488 A | * | 7/1998 | Garde ......................... 711/169 |

* cited by examiner

*Primary Examiner*—Eddie Chan
*Assistant Examiner*—Aimee J. Li
(74) *Attorney, Agent, or Firm*—Snell & Wilmer, LLP

(57) ABSTRACT

A multiprocessor includes M banks storing a plurality of instructions; and N processors each having N instruction fetch stages, wherein each of the N processors processes one of the plurality of instructions in a pipelined manner, where N is an integer equal to or greater than 2, and M is an integer equal to or greater than N, wherein each of the N processors fetches one of the plurality of instructions at a different instruction fetch stage from instruction fetch stages used by other processors.

18 Claims, 12 Drawing Sheets

FIG. 2 Pipeline structure

MULTIPROCESSOR WITH ASYNCHRONOUS PIPELINE PROCESSING OF INSTRUCTIONS, AND CONTROL METHOD THEREOF

BACKGROUND OF THE INVENTION

1. Field of the Invention

The present invention relates to a multiprocessor used in an information processing device, which performs pipeline processing of instructions, and a method for controlling the multiprocessor.

2. Description of the Related Art

In a conventional method for improving performance of a microcomputer, a plurality of processors are mounted on the same semiconductor chip, and the processors operate in parallel to one another. According to this method, when the processing capacity of a single processor is insufficient for implementing a desired application, operations of the application are allocated to a plurality of processors, thereby realizing the implementation of the application. Another application example of this method is a memory-shared multiprocessor in which a plurality of processors share a single memory. In the memory-shared multiprocessor, instructions and/or data can be shared between the plurality of processors.

Although the memory-shared multiprocessor has an advantage of sharing the instructions and the data between the processors, the memory-shared multiprocessor also has a disadvantage such that a conflict occurs when the plurality of processors simultaneously access the shared memory. In order to remove such a conflict, arbitration between the memory accesses is required, whereby the memory accesses of the processors have to be on standby during an arbitration period.

Furthermore, the order of the memory accesses of the processors depends on the content of data processed by the application. In the case where the application processes various data, it is impossible to predict the order of the memory accesses. Thus, a standby period of each processor before accessing the memory, which is caused by the arbitration between the memory accesses, cannot be estimated, whereby it is difficult to estimate the run duration of the application.

As described above, in the conventional memory-shared multiprocessor, the run duration of the application cannot be estimated because of the arbitration of a conflict between the memory accesses. Thus, it is difficult to apply the conventional memory-shared multiprocessor to the communication DSPs (digital signal processors) that requires real-time processing, or the like.

SUMMARY OF THE INVENTION

According to one aspect of the present invention, a multiprocessor includes M banks storing a plurality of instructions; and N processors each having N instruction fetch stages, wherein each of the N processors processes one of the plurality of instructions in a pipelined manner, where N is an integer equal to or greater than 2, and M is an integer equal to or greater than N, wherein each of the N processors fetches one of the plurality of instructions at a different instruction fetch stage from instruction fetch stages used by other processors.

In one embodiment of the present invention, each of the N processors fetches one of the plurality of instructions at one of the N instruction fetch stages, and processes the instruction in a pipelined manner, thereby outputting an address.

In another embodiment of the present invention, the multiprocessor further includes an address select section for outputting a bank address based on the address output from the each of the N processors.

Instill another embodiment of the present invention, each of the M banks outputs one of the plurality of instructions that corresponds to the bank address output from the address select section.

Instill another embodiment of the present invention, when the fetched instruction is a branch instruction, after the branch instruction is processed, the processor changes the instruction fetch stage at which the instruction is fetched from one to another.

In still another embodiment of the present invention, each of the N processors includes an instruction register section that receives one of the plurality of the instructions, a bank select signal, a fetch stage select signal, and an NOP select signal to output an instruction code; a decoder section that receives the instruction code to output a branch instruction signal and a branch address; a control section that receives the branch instruction signal, the branch address, and an instruction pointer signal to output the fetch stage select signal, the NOP select signal, and an address branch signal; and an instruction pointer section that receives the fetch stage select signal, the address branch signal, and the branch address to output the bank select signal, the instruction pointer signal, and the address.

According to another aspect of the present invention, in a multiprocessor including M banks storing a plurality of instructions, N processors wherein each of the N processors has N instruction fetch stages and processes one of the plurality of instructions in a pipelined manner, where N is an integer greater than 2, and M is an integer greater than N, and an address select section, a method for controlling the multiprocessor includes a step at which each of the N processors fetches one of the plurality of instructions at at least one of the N instruction fetch stages; a step at which the each of the N processors processes the fetched instruction to output an address; a step at which the address select section outputs a bank address to one of the M banks based on the address from the each of the plurality of the N processors; and a step at which the one of the M banks outputs one of the plurality of instructions that correspond to the bank address, wherein each of the N processors fetches one of the plurality of instructions at an instruction fetch stage different from the instruction fetch stages used by other processors.

In one embodiment of the present invention, when the fetched instruction is a branch instruction, after the branch instruction is processed, the processor changes the instruction fetch stage at which the instruction is fetched from one to another.

Thus, the invention described herein makes possible the advantages of (1) removing the necessity for arbitration between memory accesses when a conflict occurs in a memory-shared multiprocessor, thereby omitting an arbitration circuit for memory accesses from the multiprocessor, and (2) providing a memory-shared multiprocessor in which a run duration of an application can be easily estimated.

These and other advantages of the present invention will become apparent to those skilled in the art upon reading and understanding the following detailed description with reference to the accompanying figures.

BRIEF DESCRIPTION OF THE DRAWINGS

FIG. 2 shows a pipeline structure of a processor incorporated in the multiprocessor of the present invention.

DESCRIPTION OF THE PREFERRED EMBODIMENTS

First, the principle of the present invention is described.

Figure 1:
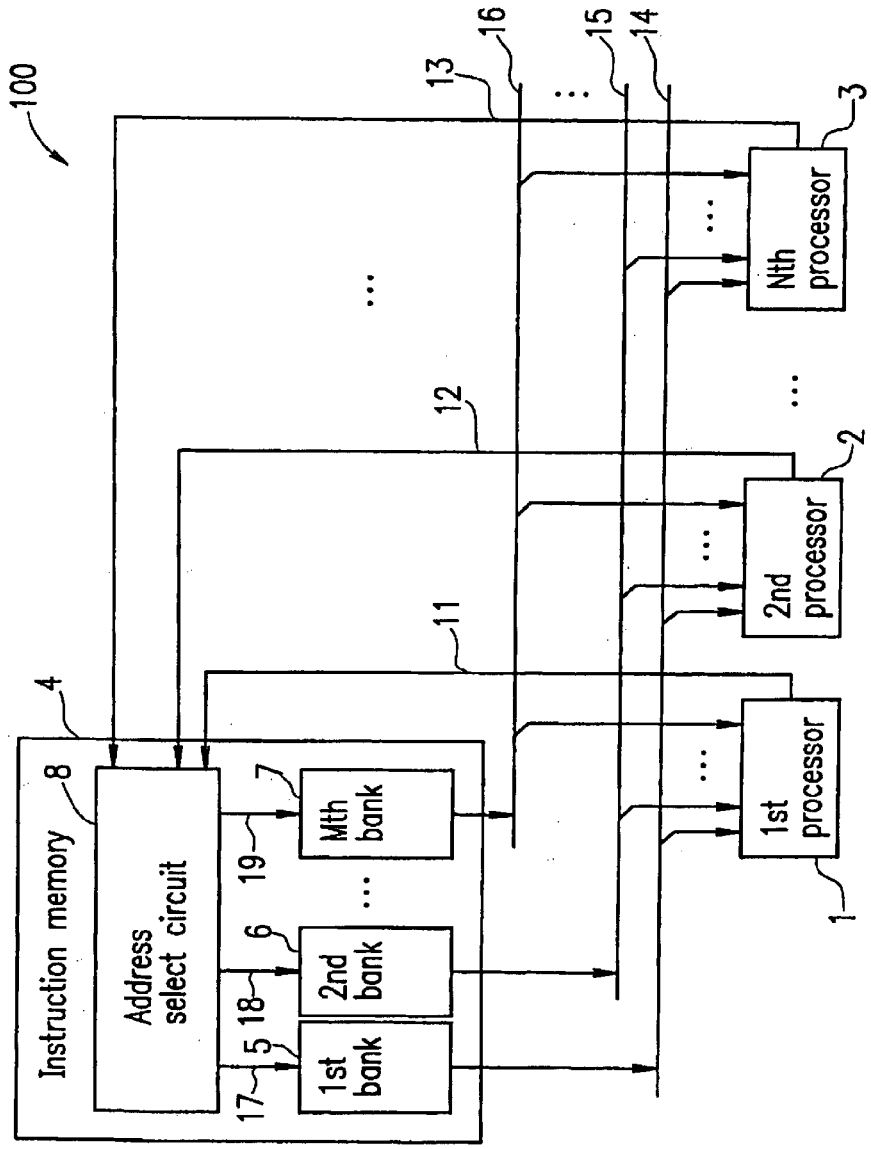
FIG. 1 shows a structure of a multiprocessor of the present invention.

FIG. 1 shows a structure of a multiprocessor 100 of the present invention. The multiprocessor 100 includes N processors (from a first processor 1 through an Nth processor 3) and an instruction memory 4. The instruction memory 4 includes M banks (from a first bank 5 through an Mth bank 7) and an address select circuit 8. Herein, N is an integer equal to or greater than 2, and M is an integer equal to or greater than N.

The N processors from the first processor 1 through the Nth processor 3 are pipeline processors that perform pipeline processing of instructions. Each processor has pipe-stages including N instruction fetch stages. A pipeline structure of the N processors will be described in detail in a later section.

Each of the M banks from a first bank 5 through an Mth bank 7 stores a plurality of instructions. The plurality of instructions stored in the M banks integrally constitute an application program to be implemented by the multiprocessor. The instructions are stored based on a system such as an interleaved system in which an instruction of the first location is stored in the first bank 5, an instruction of the second location is stored in the second bank 6, . . . , an instruction of the Mth location is stored in the Mth bank 7, and an instruction of the (M+1)th location is stored in the first bank 5. In the descriptions below, the instructions which constitute the application program are stored in the M banks based on the interleaved system. However, any other system may be used to store the instructions in the banks.

To the first processor 1, M instructions from a first instruction 14 through an Mth instruction 16 are input The first processor 1 selects one of the M instructions and fetches the selected instruction. The first processor 1 outputs a first address 11 as a processing result of the fetched instruction. Similarly, M instructions from the first instruction 14 through the Mth instruction 16 are input to the second processor 2, and the second processor 2 outputs a second address 12.

In this manner, M instructions from the first instruction 14 through the Mth instruction 16 are input to each of N processors. The N processors output N addresses from the first address 11 through the Nth address 13.

The instruction memory 4 is to store the instructions. The N addresses from the first address 11 through the Nth address 13 are input to the address select circuit 8 of the instruction memory 4. The address select circuit 8 specifies a bank corresponding to the input address from a least significant bit of the input address. A number of the least significant bit that specifies the bank corresponding to the address depends on the number of the banks, M, and is equal to or greater than 1.

The address select circuit 8 specifies a bank from a least significant bit of an address, removes the least significant bit from the address, and outputs the address not having the least significant bit as a bank address. The address select circuit 8 outputs M bank addresses from the first bank address 17 through the Mth bank address 19.

The first bank address 17 is input to the first bank 5. The first bank 5 outputs a first instruction 14 specified by the first bank address 17. The second bank address 18 is input to the second bank 6. The second bank 6 outputs an second instruction 15 specified by the second bank address 18. In the same manner, the Mth bank address 19 is input to the Mth bank 7. The Mth bank 7 outputs an Mth instruction 16 specified by the Mth bank address 19.

Figure 15:
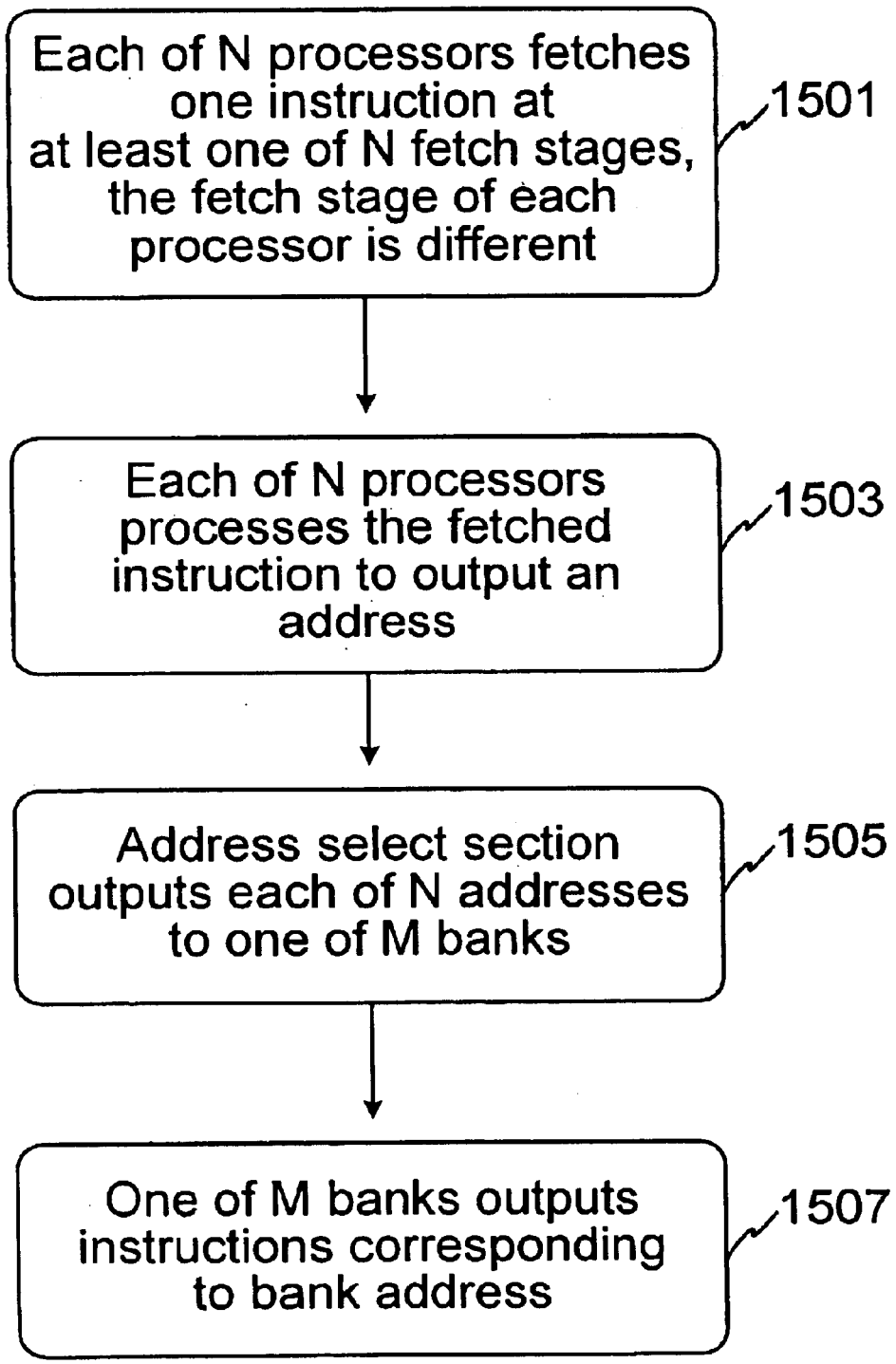
FIG. 15 illustrates a method for controlling a multiprocessor of the present invention.

FIG. 15 illustrates a method for controlling multiprocessor 100 of the present invention. Each of the N processors fetches one instruction at at least one of the N instruction fetch stages, where the fetch stage of each of the N processors is different (step 1501). Each of the N processors processes the fetched instruction to output an address (e.g., first address 11, second address 12 . . . Nth address 13) (step 1503). Address select circuit 8 outputs each of the N addresses (e.g., first bank address 17 through Mth bank address 19) to one of the M banks (e.g., first bank 5 through Mth bank 7) (step 1505). One of the M banks outputs instructions corresponding to a bank address (step 1507).

FIG. 2 shows a pipeline structure of a processor included in the multiprocessor 100 of the present invention. The processor of the present invention has pipe-stages F(1), F(2), . . . F(N), DC, and EX. Among these stages, the N stages from F(1) through F(N) are instruction fetch stages. Each of the processors included in the multiprocessor 100 has the same number of instruction fetch stages as the number of the processors. The stage F(1) is the first instruction fetch stage, the stage F(2) is the second instruction fetch stage, and the stage F(N) is the Nth instruction fetch stage. The stage DC is a decoding stage, and the stage EX is an execution stage.

Each of the N processors included in the multiprocessor 100 employs any one of the N instruction fetch stages so that a plurality of processors do not simultaneously access the same bank. Each processor accesses the M banks included in the instruction memory 4.

Hereinafter, embodiments of the present invention will be described with reference to the drawings. For convenience in the descriptions, it is assumed that M is equal to N (M=N). Although the addresses from the first bank address 17 through the Mth bank address 19 have their least significant bits removed, they are expressed similarly to the addresses from the first address 11 through the Nth address 13, i.e., they are expressed as if they have their least significant bits, for convenience of explanation.

Embodiment 1

A multiprocessor and a control method thereof are described. In embodiment 1, it is assumed that N=3.

(Sequential Processing of Instructions)

Figure 3:
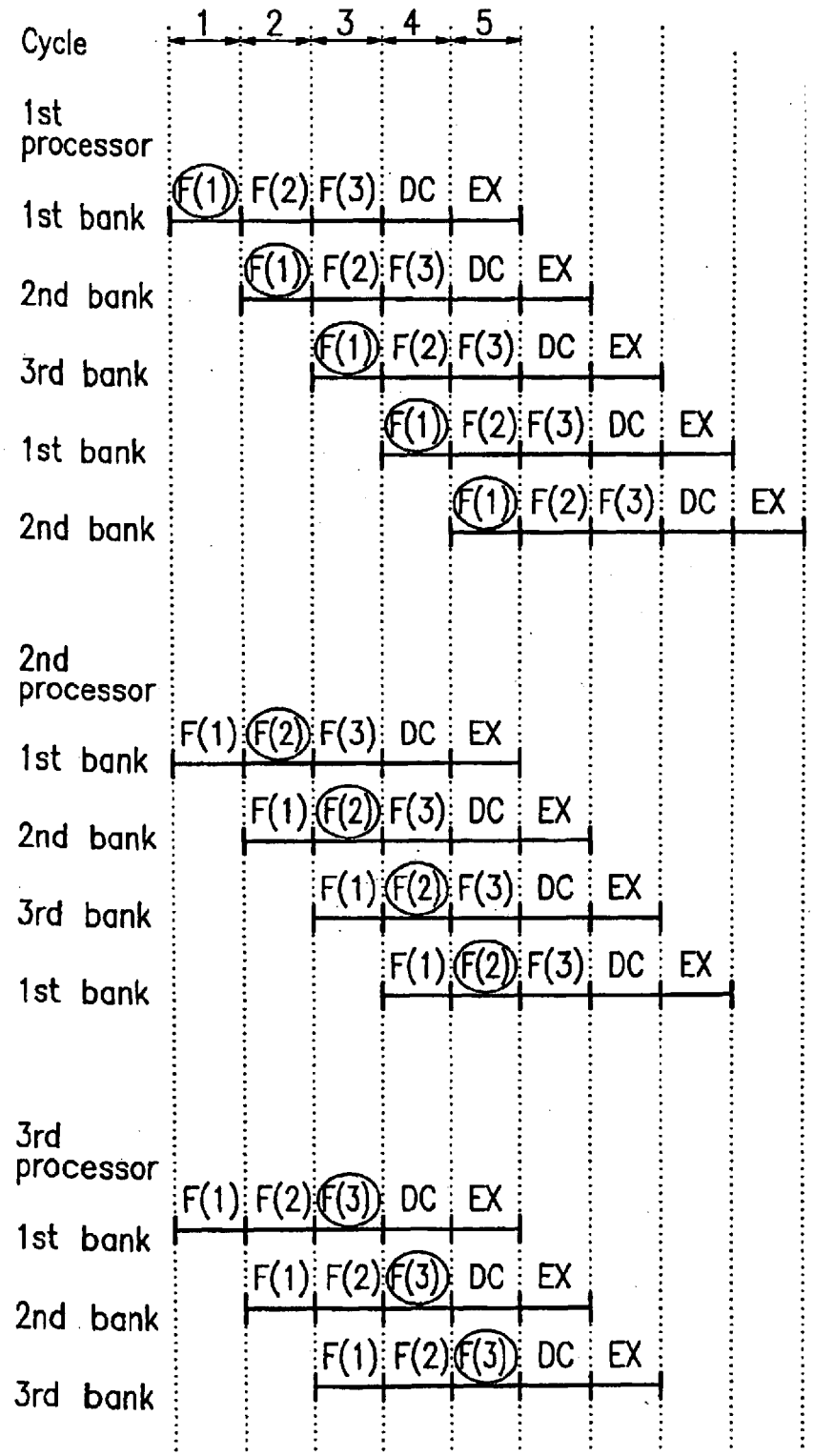
FIG. 3 is a timing chart when the processor performs sequential processing according to embodiment 1 of the present invention.

FIG. 3 is a timing chart for a sequential processing of the processor according to embodiment 1 of the present invention. Operations of the processor when instructions are sequentially processed are described with reference to FIG. 3 in conjunction with FIG. 1.

TABLE 1

|  | Initial Allocation of Instruction Fetch Stages | | | | | |
| --- | --- | --- | --- | --- | --- | --- |
|  | Pn. 1 | Pn. 2 | Pn. 3 | Pn. 4 | Pn. 5 | Pn. 6 |
| 1st Processor | F(1) | F(1) | F(2) | F(2) | F(3) | F(3) |
| 2nd Processor | F(2) | F(3) | F(1) | F(3) | F(1) | F(2) |
| 3rd Processor | F(3) | F(2) | F(3) | F(1) | F(2) | F(1) |

Table 1 shows an initial allocation pattern of instruction fetch stages to respective processors. When N=3, there are six possible initial allocation patterns of instruction fetch stages (Pn. 1 to Pn. 6). In embodiment 1, pattern 1 is employed for the initial allocation of the instruction fetch stages. That is, the first instruction fetch stage F(1) is allocated to the first processor 1, the second instruction fetch stage F(2) is allocated to the second processor 2, the third instruction fetch stage F(3) is allocated to the third processor 3.

<1st Cycle>

The first processor 1 fetches an instruction from the first bank 5. Specifically, the multiprocessor 100 operates as described below.

The first processor 1 outputs the first instruction address 11 to the address select circuit 8. The address select circuit 8 outputs the first instruction address 11 to the first bank address 17. The first bank 5 outputs an instruction in a location specified by the first bank address 17 to the first processor 1 as the first instruction 14. Thus, the first processor 1 fetches the first instruction 14.

<2nd Cycle>

The first processor 1 fetches an instruction from the second bank 6, and the second processor 2 fetches an instruction from the first bank 5. Specifically, the multiprocessor 100 operates as described below.

The first processor 1 outputs the first instruction address 11 to the address select circuit 8. The address select circuit 8 outputs the first instruction address 11 to the second bank address 18. The second bank 6 outputs an instruction in a location specified by the input second bank address 18 to the first processor 1 as the second instruction 15. Thus, the first processor 1 fetches the second instruction 15.

The second processor 2 outputs the second instruction address 12 to the address select circuit 8. The address select circuit 8 outputs the second instruction address 12 to the first bank address 17. The first bank 5 outputs an instruction in a location specified by the input first bank address 17 to the second processor 2 as the first instruction 14. Thus, the second processor 2 fetches the first instruction 14.

<3rd Cycle>

The first processor 1 fetches an instruction from the third bank 7, the second processor 2 fetches an instruction from the second bank 6, and the third processor 3 fetches an instruction from the first bank 5. Specifically, the multiprocessor 100 operates as described below.

The first processor 1 outputs the first instruction address 11 to the address select circuit 8. The address select circuit 8 outputs the first instruction address 11 to the third bank address 19. The third bank 7 outputs an instruction in a location specified by the input third bank address 19 to the first processor 1 as the third instruction 16. Thus, the first processor 1 fetches the third instruction 16.

The second processor 2 outputs the second instruction address 12 to the address select circuit 8. The address select circuit 8 outputs the second instruction address 12 to the second bank address 18. The second bank 6 outputs an instruction in a location specified by the input second bank address 18 to the second processor 2 as the second instruction 15. Thus, the second processor 2 fetches the second instruction 15.

The third processor 3 outputs the third instruction address 13 to the address select circuit 8. The address select circuit 8 outputs the third instruction address 13 to the first bank address 17. The first bank 5 outputs an instruction in a location specified by the input first bank address 17 to the third processor 3 as the first instruction 14. Thus, the third processor 3 fetches the first instruction 14.

<4th Cycle>

The first processor 1 fetches an instruction from the first bank 5, the second processor 2 fetches an instruction from the third bank 7, and the third processor 3 fetches an instruction from the second bank 6. Among the operations of the multiprocessor 100, an operation of the first processor 1 to fetch an instruction from the first bank 5 is same as that of the first cycle, and the description thereof is thus omitted. The second processor 2 and the third processor 3 operate as described below.

The second processor 2 outputs the second instruction address 12 to the address select circuit 8. The address select circuit 8 outputs the second instruction address 12 to the third bank address 19. The third bank 7 outputs an instruction in a location specified by the input third bank address 19 to the second processor 2 as the third instruction 16. Thus, the second processor 2 fetches the third instruction 16.

The third processor 3 outputs the third instruction address 13 to the address select circuit 8. The address select circuit 8 outputs the third instruction address 13 to the second bank address 18. The second bank 6 outputs an instruction in a location specified by the input second bank address 18 to the third processor 3 as the second instruction 15. Thus, the third processor 3 fetches the second instruction 15.

<5th Cycle>

The first processor 1 fetches an instruction from the second bank 6, the second processor 2 fetches an instruction from the first bank 5, and the third processor 3 fetches an instruction from the third bank 7. Among the operations of the multiprocessor 100, an operation of the first processor 1 to fetch an instruction from the second bank 6 and an operation of the second processor 2 to fetch an instruction from the first bank 5 are the same as those in the 2nd cycle, and descriptions thereof are thus omitted. The third processor 3 operate as described below.

The third processor 3 outputs the third instruction address 13 to the address select circuit 8. The address select circuit 8 outputs the third instruction address 13 to the third bank address 19. The third bank 7 outputs an instruction in a location specified by the input third bank address 19 to the third processor 3 as the third instruction 16. Thus, the third processor 3 fetches the third instruction 16.

As described above, The first processor 1 uses the first instruction fetch stage F(1), the second processor 2 uses the second instruction fetch stage F(2), and the third processor 3 uses the third instruction fetch stage F(3) in order to fetch instructions from respective banks of the instruction memory 4. As a result, the respective processors exclusively access the respective banks at a time on one-to-one basis.

(Branch Processing of Instructions)

Figure 4:
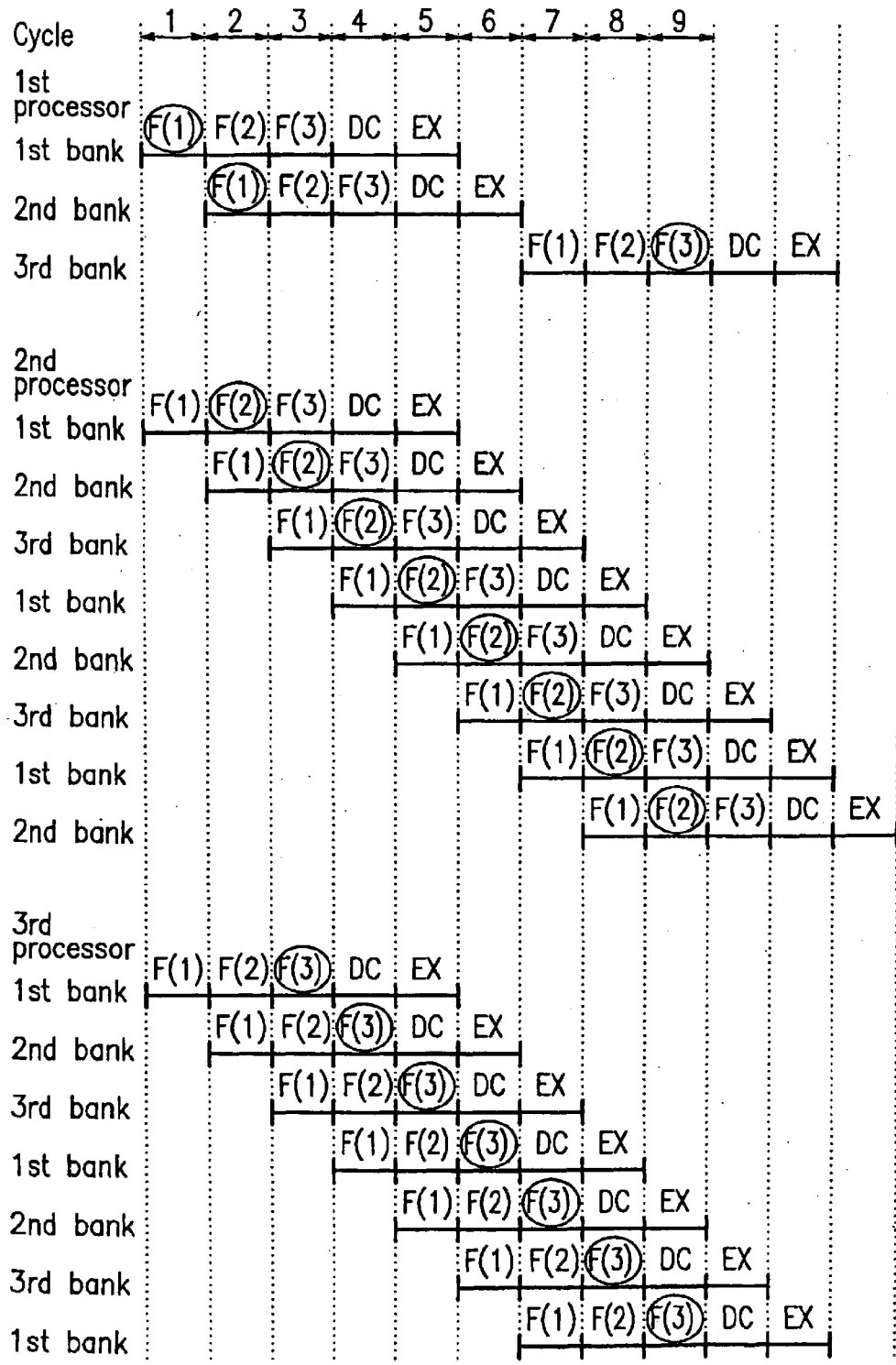
FIG. 4 is a timing chart when the processor performs branch processing according to embodiment 1 of the present invention.

FIG. 4 is a timing chart when the processor of embodiment 1 of the present invention performs branch processing. Operations of the processor when it performs branch processing of instructions are described with reference to FIG. 4 in conjunction with FIG. 1. In the following descriptions, N=3, and the first instruction fetch stage F(1) is allocated to the first processor 1, the second instruction fetch stage F(2) is allocated to the second processor 2, and the third instruction fetch stage F(3) is allocated to the third processor 3. In addition, it is assumed that the first processor 1 fetches a branch instruction in the second cycle, and resumes fetching instructions in the 7th cycle after the branch processing has been completed.

<1st Cycle>

In a similar manner to the sequential processing of the instructions, the first processor 1 fetches an instruction from the first bank 5.

<2nd Cycle>

In a similar manner to the sequential processing of the instructions, the first processor 1 fetches an instruction from the second bank 6, and the second processor 2 fetches an instruction from the first bank 5.

<3rd Cycle>

The first processor 1 is on standby for fetching the instructions. In a similar manner to the sequential processing of the instructions, the second processor 2 fetches an instruction from the second bank 6, and the third processor 3 fetches an instruction from the first bank 5.

<4th Cycle>

The first processor 1 is on standby for fetching the instructions. In a similar manner to the sequential processing of the instructions, the second processor 2 fetches an instruction from the third bank 7, and the third processor 3 fetches an instruction from the second bank 6.

<5th Cycle>

The first processor 1 is on standby for fetching the instructions. In a similar manner to the sequential processing of the instructions, the second processor 2 fetches an instruction from the first bank 5, and the third processor 3 fetches an instruction from the third bank 7.

<6th Cycle>

The first processor 1 is on standby for fetching the instructions. In a similar manner to the operations in the 3rd cycle, the second processor 2 fetches an instruction from the second bank 6, and the third processor 3 fetches an instruction from the first bank 5.

<7th Cycle>

The first processor 1 is on standby for fetching the instructions because its access to the third bank 7 coincides with an access of the second processor 2 to the third bank 7. In a similar manner to the operations in the 4th cycle, the second processor 2 fetches an instruction from the third bank 7, and the third processor 3 fetches an instruction from the second bank 6.

<8th Cycle>

The first processor 1 is on standby for fetching the instructions because the first processor 1 conflicts with the third processor 3 when it accesses the third bank 7. In a similar manner to the operations in the 5th cycle, the second processor 2 fetches an instruction from the first bank 5, and the third processor 3 fetches an instruction from the third bank 7.

<9th Cycle>

The first processor 1 fetches an instruction from the third bank 7, in a similar manner to the operations in the 3rd cycle of the sequential processing of the instructions. The second processor 2 fetches an instruction from the second bank 6, and the third processor 3 fetches an instruction from the first bank 5 in a similar manner to the operations in the 3rd cycle.

As described above, the first processor 1 changes an instruction fetch stage to be employed from the first instruction fetch stage F(1) to the third instruction fetch stage F(3) in order to fetch a subsequent instruction. As a result, the respective processors access the respective banks exclusively on one-to-one basis.

Figure 5:
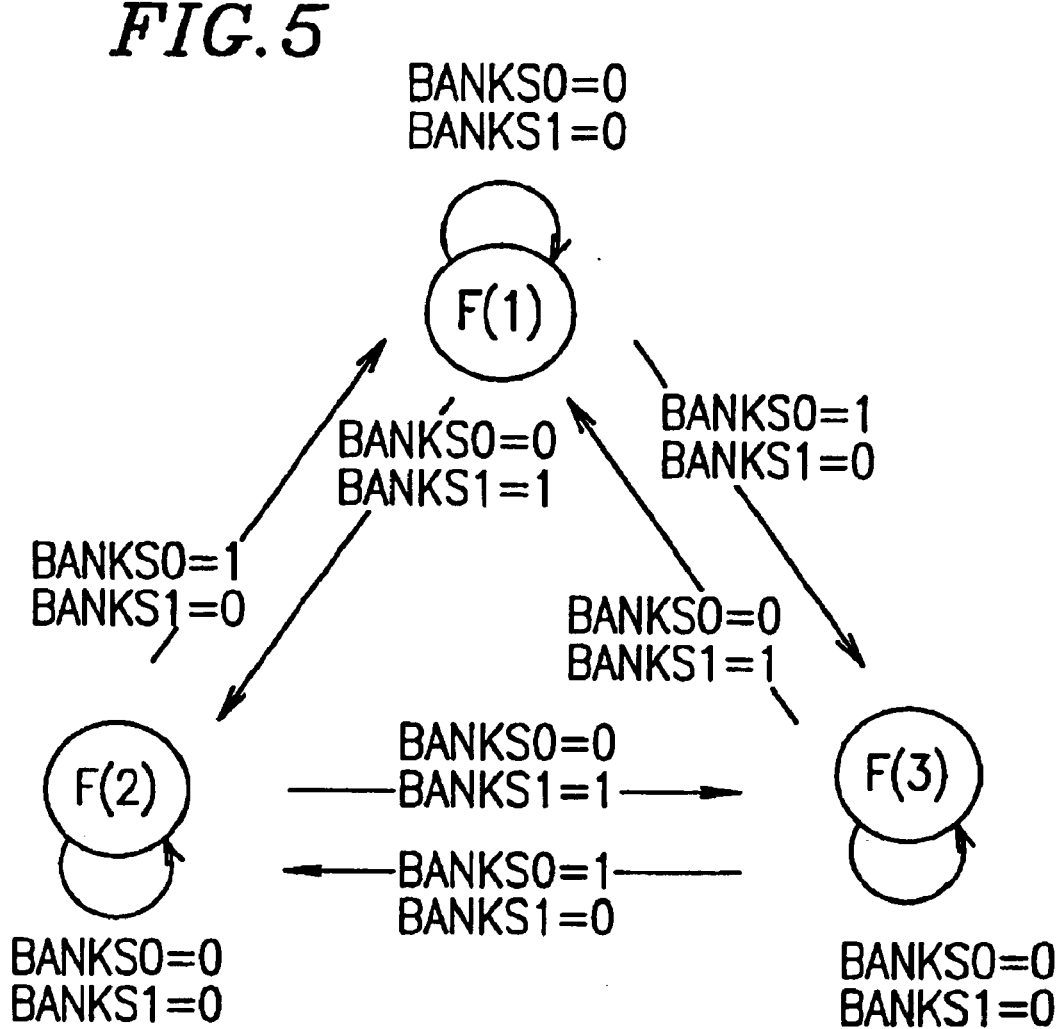
FIG. 5 shows a method for changing instruction fetch stages employed by the processor according to embodiment 1 of the present invention.

FIG. 5 shows a method for changing instruction fetch stages employed in the processor of embodiment 1. Switching of the instruction fetch stages F(1), F(2), and F(3) is performed as shown in FIG. 5 based on bank switch signals BANKS0 and BANKS1 in the processors 1, 2, and 3. When BANKS0=0 and BANKS1=0, the instruction fetch stages are not changed. When BANKS0=0 and BANKS1=1, F(1) is changed to F(2), F(2) is changed to F(3), and F (3) is changed to F(1). When BANKS0=1 and BANKS1=0, F(1) is changed to F(3), F(2) is changed to F(1), and F(3) is changed to F(2).

When an address immediately before the branch point is IP[15:0], and an address immediately after the branch point is JIP[15:0], the values of BANKS0 and BANKS1 are determined by, for example, the following source code:

```
if ( IP[1:0] = = JIP[1:0] )
  then
    BANKS0 = 1;
    BANKS1 = 0;
  else if ( IP[1:0]-1 = = JIP[1:0] )
    BANKS0 = 0;
    BANKS1 = 1;
  else
    BANKS0 = 0;
    BANKS1 = 0;
```

In embodiment 1, each processor of the multiprocessor 100 has a plurality of the instruction fetch stages. Each processor employs a different instruction fetch stage from those used by the other processors in order to fetch the instructions, thereby exclusively accessing the first bank 5, the second bank 6, and the third bank 7. In the case where the processor fetches a branch instruction, after the branch instruction are implemented, the processor changes the instruction fetch stage to be employed to any other stage in order to fetch a subsequent instruction, thereby accessing respective banks exclusively. As a result, the instruction memory can be shared without occurrences of conflicts among memory accesses.

Figure 16:
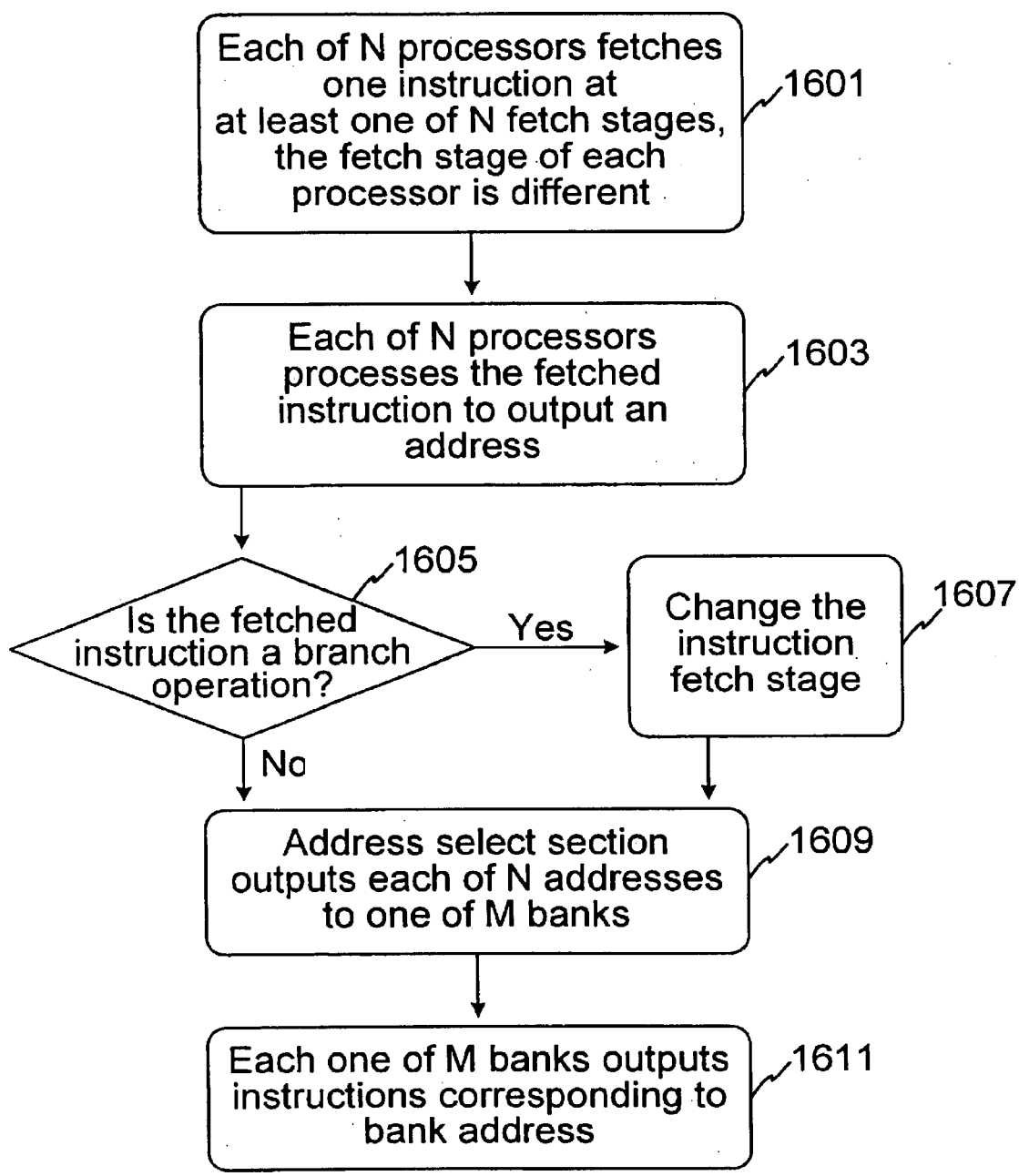
FIG. 16 illustrates a method for controlling a multiprocessor of the present invention.

FIG. 16 illustrates a method for controlling multiprocessor 100 of the present invention in connection with embodiment 1 (and may apply to various other embodiments of the present invention). Each of The N processors fetches one instruction at at least one of the N instruction fetch stages, where the fetch stage of each of the N processors is different (step 1601). Each of the N processors processes the fetched instruction to output an address (e.g., first address 11, second address 12 ... Nth address 13) (step 1603). A determination is made as to whether the fetched instruction is a branch operation (step 1605) If the fetched instruction is a branch operation and after the branch instruction is implemented, the processor (which fetched the instruction) changes the instruction fetch stage to be employed to any other stage (in order to fetch a subsequent instruction) (step 1607). Accordingly, address select circuit 8 outputs each of N addresses to one of the M banks (step 1609). If the fetched instruction is not a branch operation, then address select circuit 8 outputs each of N addresses to one of the M banks (step 1609) without changing the instruction fetch stage. Finally, each one of the M banks outputs instructions corresponding to the bank address (step 1611).

(Embodiment 2)

A multiprocessor and a control method thereof according to embodiment 2 of the present invention are described with reference to the drawings.

Figure 6:
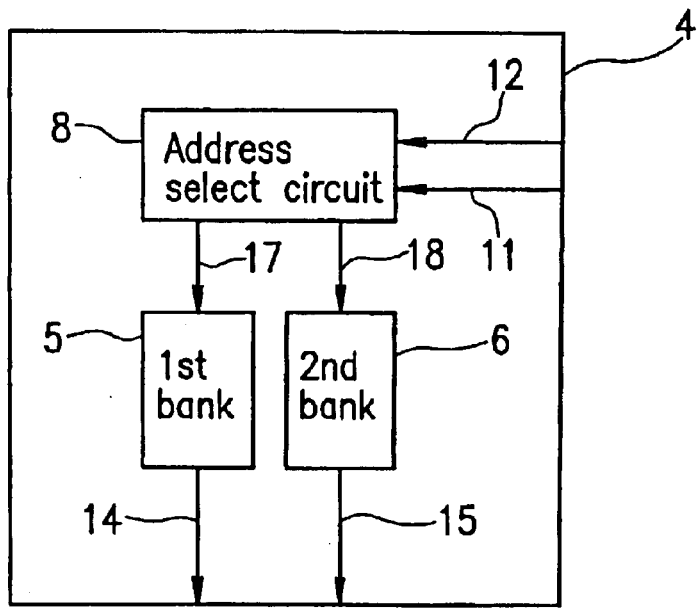
FIG. 6 shows a structure of an instruction memory according to embodiment 2 of the present invention.

FIG. 6 shows a structure of an instruction memory 4 in the multiprocessor 100 according to embodiment 2 of the present invention. The instruction memory 4 of FIG. 6 corresponds to the instruction memory 4 of FIG. 1 when M=2. Accordingly, the instruction memory 4 of FIG. 6 includes the first bank 5 and the second bank 6, and the address select circuit 8.

Figure 7:
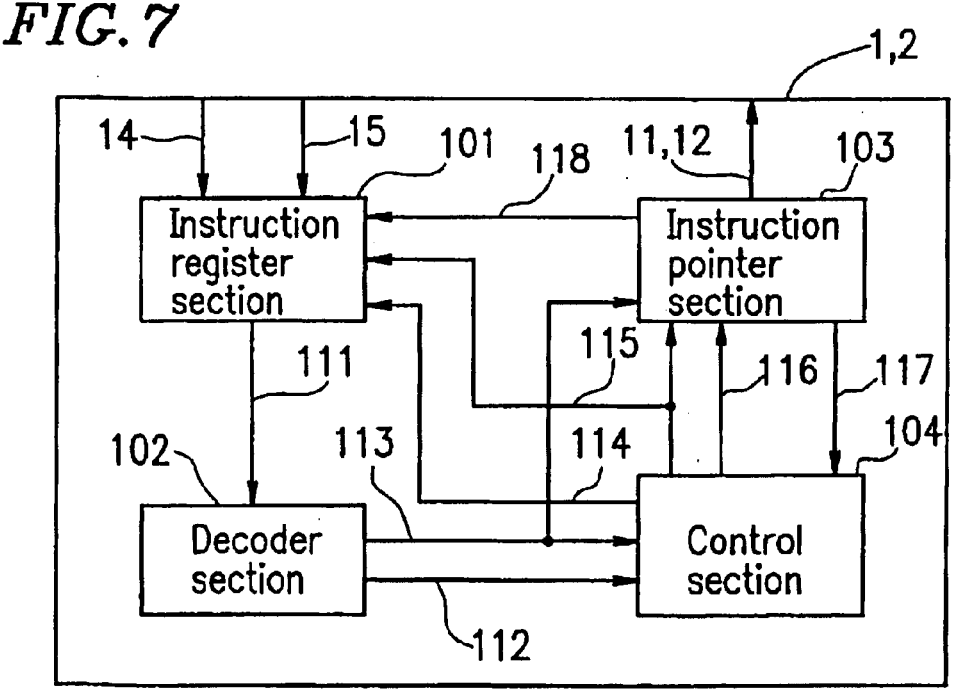
FIG. 7 shows a structure of a processor according to embodiment 2 of the present invention.

FIG. 7 shows a structure of processors 1 and 2 incorporated in the multiprocessor 100 according to embodiment 2 of the present invention. The processors 1 and 2 have the same structure. Each of the processors 1 and 2 has an instruction register section 101, an decoder section 102, an instruction pointer section 103, and a control section 104.

The first instruction 14, the second instruction 15, a NOP select signal 114, a fetch stage select signal 115, and a bank select signal 118 are input to the instruction register section 101. The instruction register section 101 outputs a instruction code 111 based on the input signals.

The instruction code 111 is input to the decoder section 102. The decoder section 102 outputs a branch instruction signal 112 and a branch address 113 based on the instruction code 111.

The branch address 113, the fetch stage select signal 115, and an address branch signal 116 are input to the instruction pointer section 103. The instruction pointer section 103 outputs an instruction pointer signal 117, the bank select signal 118, and the first address 11 or the second address 12 based on the input signals.

Figure 8:
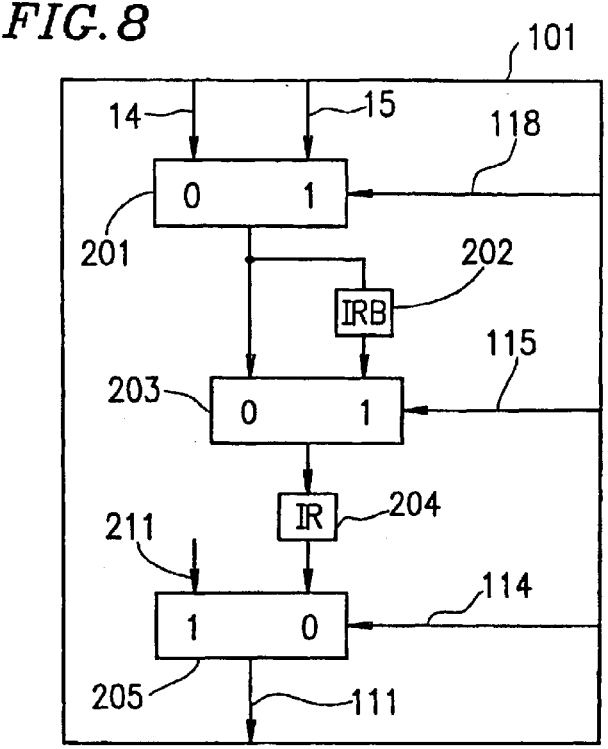
FIG. 8 shows a structure of an instruction register section in the processor according to embodiment 2 of the present invention.

FIG. 8 shows a structure of the instruction register section 101 in the processors 1 and 2 according to embodiment 2 of the present invention. The instruction register section 101 includes the first instruction selector 201, the first instruction register 202, the second instruction selector 203, the second instruction register 204, and the third instruction selector 205.

The first instruction 14, the second instruction 15, the bank select signal 118 are input to the first instruction selector 201. An output from the first instruction selector 201 is input to the first instruction register 202. The output from the first instruction selector 201, an output from the first instruction register 202, and the fetch stage select signal 115 are input to the second instruction selector 203. An output from the second instruction selector 203 is input to the second instruction register 204. An output from the second instruction register 204, a NOP code 211, the NOP select signal 114 are input to the third instruction selector 205. The third instruction selector 205 outputs the instruction code 111 based on the input signals.

Figure 9:
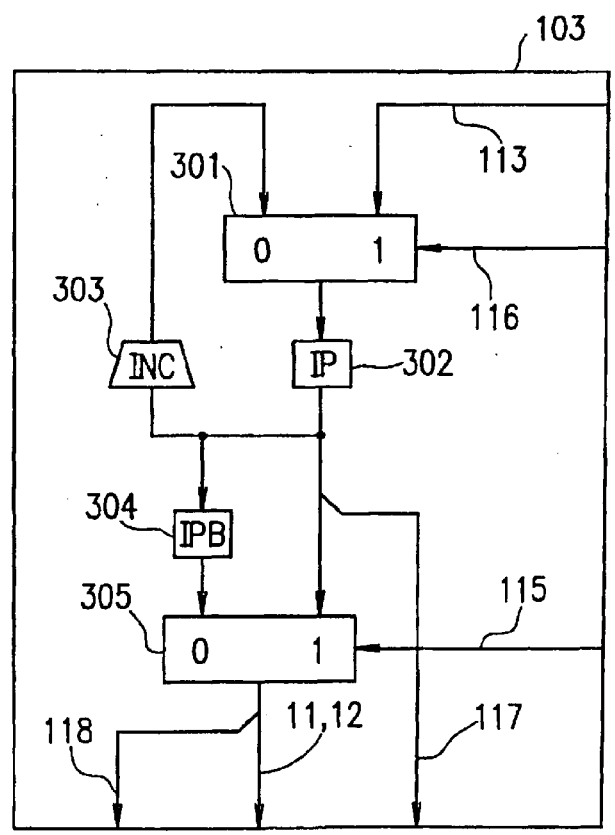
FIG. 9 shows a structure of an instruction pointer section in the processor according to embodiment 2 of the present invention.

FIG. 9 shows a structure of an instruction pointer section 103 in the processors 1 and 2 according to embodiment 2 of the present invention. The instruction pointer section 103 includes a first address selector 301, a first instruction pointer 302, an adder 303, a second instruction pointer 304, and a second address selector 305.

The branch address 113, an output from the adder 303, and the address branch signal 116 are input to the first address selector 301. An output from the first address selector 301 is input to the first instruction pointer 302. The first instruction pointer 302 outputs a least significant bit of the output from the first address selector 301 as an instruction pointer signal 117. An output from the first instruction pointer 302 is input to the adder 303. The output from the first instruction pointer 302 is also input to the second instruction pointer 304. The output from the first instruction pointer 302, an output from the second instruction pointer 304, and the fetch stage select signal 115 are input to the second address selector 305. The second address selector 305 outputs a first address 11 or a second address 12 and a least significant bit of the first address 11 or the second address 12 as a bank select signal 118.

Figure 10:
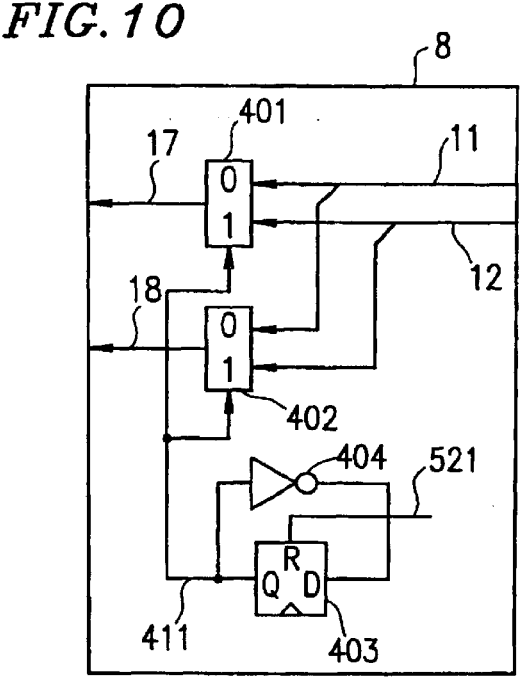
FIG. 10 shows a structure of an address select circuit according to embodiment 2 of the present invention.

FIG. 10 shows a structure of the address select circuit 8 according to embodiment 2 of the present invention. The address select circuit 8 includes a first processor selector 401, a second processor selector 402, a flip-flop 403, and an inverter 404.

The flip-flop 403 is a D-type flip-flop. The flip-flop 403 receives an output from the inverter 404 and a reset signal 521, and outputs the processor select signal 411. The inverter 404 receives and inverts the processor select signal 411. The first address 11, the second address 12, and a processor select signal 411 are input to the first processor selector 401. The first processor selector 401 outputs a first bank address 17 based on the input signals. The first address 11, the second address 12, and a processor select signal 411 are input to the second processor selector 402. The second processor selector 402 outputs a second bank address 18 based on the input signals.

Figure 11:
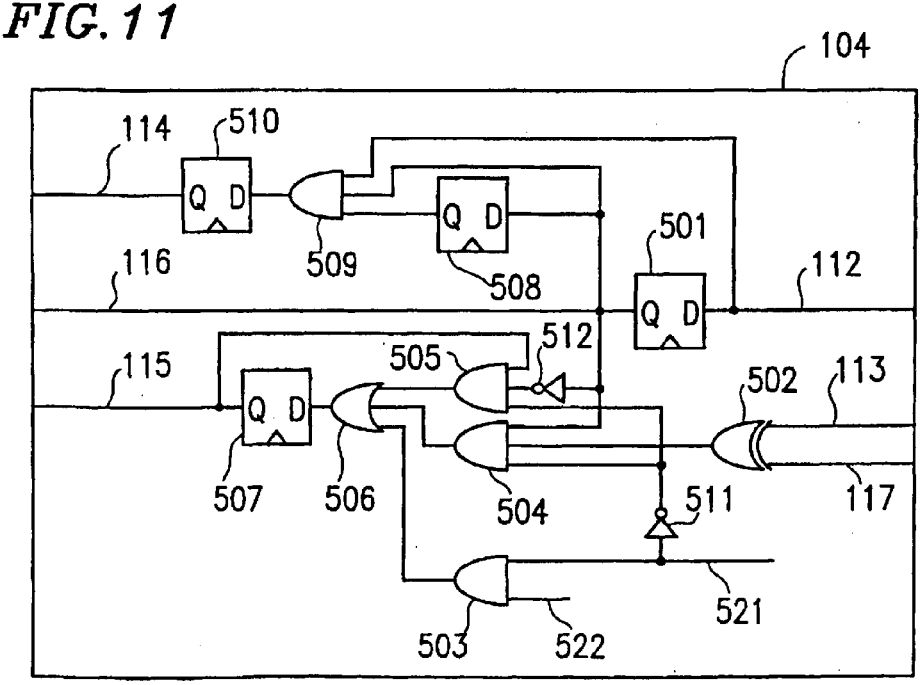
FIG. 11 shows a structure of a control section in the processors according to embodiment 2 of the present invention.

FIG. 11 shows a structure of a control section 104 in the processors 1 and 2 according to embodiment 2 of the present invention. The control section 104 includes flip-flops 501, 507, 508, and 510, an exclusive-OR gate 502, AND gates 503, 504, 505, and 509, an OR gate 506, and inverters 511 and 512.

The flip-flops 501, 507, 508, and 510 are D-type flip-flops. Each of the AND gates 503, 504, 505, and 509 outputs a logical product of a plurality of input signals. Each of the inverters 511 and 512 inverts a phase of an input signal, and outputs the inverted signal.

The flip-flop 501 outputs an address branch signal 116 based on the branch instruction signal 112. The exclusive-OR gate 502 outputs an exclusive-logical sum of the branch address 113 and the instruction pointer signal 117. The AND gates 503 outputs a logical product of the reset signal 521 and a numeric value 522. The numeric value 522 is set to "1"

or "0" for each processor. The AND gate 504 outputs a logical product of the address branch signal 116, the exclusive-logical sum from the exclusive-OR gate 502, and the output from the inverter 511. The AND gate 505 outputs a logical product of the fetch stage select signal 115, the output from the inverter 511, and the output from the inverter 512. The OR gate 506 outputs a logical sum of the output from the AND gate 503, the output from the AND gate 504, and the output from the AND gate 505. The flip-flop 507 outputs a fetch stage select signal 115 based on the output from the OR gate 506. The flip-flop 508 outputs a signal based on the address branch signal 116 to the AND gate 509. The AND gate 509 outputs a logical product of the address branch signal 116, the branch instruction signal 112, and the output signal from the flip-flop 508. The flip-flop 510 outputs an NOP select signal 114 based on the logical product from the AND gate 509. The inverter 511 inverts the reset signal 521 and outputs the inverted signal. The inverter 512 inverts the address branch signal 116 and outputs the inverted signal.

Now, operations of the multiprocessor 100 having the above structure are described with reference to FIGS. 12 and 13 in conjunction with FIGS. 6 through 11. In the following description, instructions in even-numbered locations are stored in the first bank 5, and instructions in odd-numbered locations are stored in the second bank 6. In this embodiment, for convenience of explanation, the first bank address 17 and the second bank address 18 have their least significant bit unremoved, and thus have the same numeric values as those of the first address 11 and the second address 12, respectively.

(Sequential Processing of Instructions)

Figure 12:
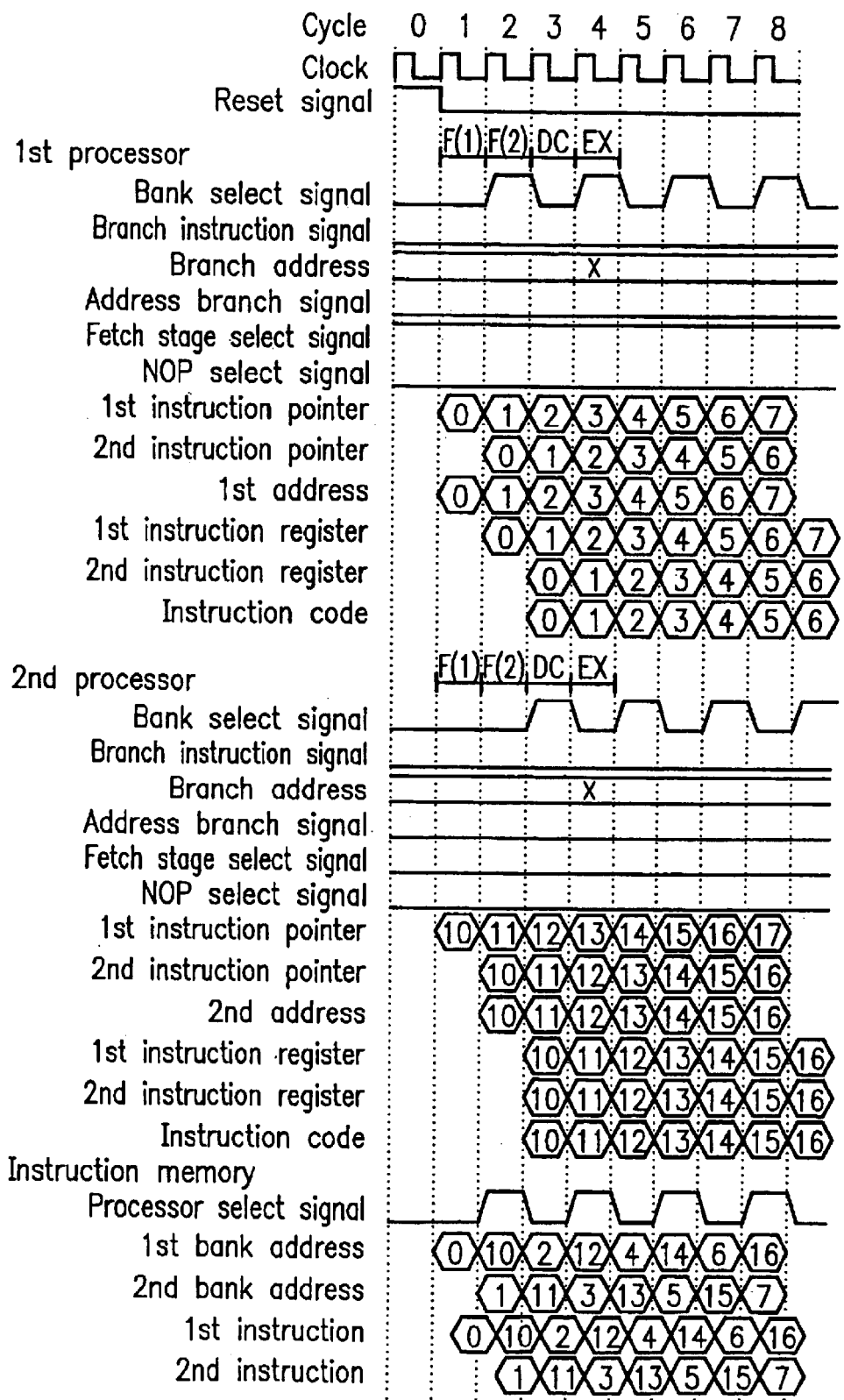
FIG. 12 is a timing chart when the processor performs sequential processing according to embodiment 2 of the present invention.

FIG. 12 is a timing chart when the processors of embodiment 2 of the present invention performs a sequential processing. With reference to FIG. 12 in conjunction with FIGS. 6 through 11, operations of the processors when they perform a sequential processing are described. Herein, each pipeline is a four-stage pipeline including a first instruction fetch stage F(1), a second instruction fetch stage F(2), a decoding stage DC, and an execution stage EX. The first instruction fetch stage F(1) is allocated to the first processor 1, and the second instruction fetch stage F(2) is allocated to the second processor 2. It is assumed that the numeric value 522 is "1" for the first processor 1, and the numeric value 522 is "0" for the second processor 2.

<0th Cycle>

In the 0th cycle, the value of the reset signal 521 to be input to the processors 1 and 2 is "1".

In the control section 104 (FIG. 11) of the first processor 1, the numeric value 522 is "1", and the value of the reset signal 521 is "1". Accordingly, an output value from the AND gate 503 is "1". Thus, an output value from the OR gate 506 is "1", and the value of the fetch stage select signal 115 output from the flip-flop 507 is also "1".

On the other hand, in the control section 104 (FIG. 11) of the processor 2, the numeric value 522 is "0". Therefore, the output value from the AND gate 503 is "0" even when the value of the reset signal 521 is "1". Accordingly, an output value from the OR gate 506 is "0", and the value of the fetch stage select signal 115 output from the flip-flop 507 is also "0".

<1st Cycle>

In the instruction pointer section 103 (FIG. 9) of the first processor 1, the value of the first instruction pointer 302 is "0", and the value of the second instruction pointer 304 is "undefined". Since the value of the fetch stage select signal 115 is "1", the second address selector 305 outputs the value of the first instruction pointer 302 as the first address 11. As a result, "0" is output as the first address 11.

In the instruction pointer section 103 (FIG. 9) of the second processor 2, the value of the first instruction pointer 302 is "10", and the value of the second instruction pointer 304 is "undefined". Since the value of the fetch stage select signal 115 is "0", the second address selector 305 outputs the value of the second instruction pointer 304 as the second address 12. As a result, "undefined" is output as the second address 12.

In the address select circuit 8 (FIG. 10) of the instruction memory 4, the value of the processor select signal 411 is "0". Since the value of the processor select signal 411 is "0", the first processor selector 401 outputs the first address 11 as the first bank address 17. As a result, the value of the first bank address 17 is "0". Accordingly, the first bank 5 (FIG. 6) outputs an instruction in a "0"th location as a first instruction 14.

On the other hand, since the value of the processor select signal 411 is "0", the second processor selector 402 outputs the second address 12 as the second bank address 18. As a result, the value of the second bank address 18 is "undefined". Accordingly, the second bank 6 (FIG. 6) outputs an instruction in an "undefined" location as a second instruction 15.

<2nd Cycle>

In the instruction pointer section 103 (FIG. 9) of the first processor 1, the value of the first instruction pointer 302 is "1", and the value of the second instruction pointer 304 is "0". Since the value of the fetch stage select signal 115 is "1", the second address selector 305 outputs the value of the first instruction pointer 302 as the first address 11. Since the first instruction 14 of the 1st cycle is the instruction in the "0"th location, the first instruction register 202 fetches the instruction in the "0"th location.

In the instruction pointer section 103 (FIG. 9) of the second processor 2, the value of the first instruction pointer 302 is "11", and the value of the second instruction pointer 304 is "10". Since the value of the fetch stage select signal 115 is "0", the second address selector 305 outputs the value of the second instruction pointer 304 as the second address 12. As a result, "10" is output as the second address 12.

In the address select circuit 8 (FIG. 10) of the instruction memory 4, the value of the processor select signal 411 is "1". Since the value of the processor select signal 411 is "1", the first processor selector 401 outputs the first address 11 as the first bank address 17. As a result, the value of the first bank address 17 is "10". Accordingly, the first bank 5 (FIG. 6) outputs an instruction in a "10"th location as a first instruction 14.

On the other hand, since the value of the processor select signal 411 is "1", the second processor selector 402 outputs the first address 11 as the second bank address 18. As a result, the value of the second bank address 18 is "1". Accordingly, the second bank 6 (FIG. 6) outputs an instruction in an "1"st location as a second instruction 15.

<3rd Cycle>

In the instruction pointer section 103 (FIG. 9) of the first processor 1, the value of the first instruction pointer 302 is "2", and the value of the second instruction pointer 304 is "1". Since the value of the fetch stage select signal 115 is "1", the second address selector 305 outputs the value of the first instruction pointer 302 as the first address 11. As a result, "2" is output as the first address 11. Since the first instruction 14 of the 2nd cycle is the instruction in the "1"st location, the first instruction register 202 (FIG. 8) of the first processor 1 fetches the instruction in the "1"st location. In the instruction register section 101 (FIG. 8), since the value of the fetch stage select signal 115 is "1", the second instruction selector 203 outputs the value of the first instruction register 202. The second instruction register 204 fetches the instruction in the "0"th location because the first instruction register 202 has fetched the instruction in the "0"th location in the 1st cycle. Since the value of the NOP select signal 114 is "0", the third instruction selector 205 outputs the value of the second instruction register 204 as the instruction code 111. As a result, the content of the instruction code 111 is the instruction in the "0"th location.

In the instruction pointer section 103 (FIG. 9) of the second processor 2, the value of the first instruction pointer 302 is "12", and the value of the second instruction pointer 304 is "11". Since the value of the fetch stage select signal 115 is "0", the second address selector 305 outputs the value of the second instruction pointer 304 as the second address 12. As a result, "11" is output as the second address 12. Since the second instruction 15 of the 2nd cycle is the instruction in the "10"th location, the first instruction register 202 (FIG. 8) of the first processor 1 fetches the instruction in the "10"th location. In the instruction register section 101 (FIG. 8), since the value of the fetch stage select signal 115 is "0", the second instruction selector 203 outputs the value of the first instruction selector 201. Since the second instruction 15 of the 2nd cycle is the instruction in the "10"th location, the second instruction register 204 fetches the instruction in the "10"th location. Since the value of the NOP select signal 114 is "0", the third instruction selector 205 outputs the value of the second instruction register 204 as the instruction code 111. As a result, the content of the instruction code 111 is the instruction in the "10"th location.

In the address select circuit 8 (FIG. 10) of the instruction memory 4, the value of the processor select signal 411 is "0". Accordingly, the value of the first address 11, "2", is output as the first bank address 17, and the value of the second address 12, "11", is output as the second bank address 18. Thus, the first bank 5 (FIG. 6) outputs an instruction in a "2"nd location as a first instruction 14, and the second bank 6 (FIG. 6) outputs an instruction in a "11"th location as a second instruction 15.

<4th Cycle>

In the instruction pointer section 103 (FIG. 9) of the first processor 1, the value of the first instruction pointer 302 is "3", and the value of the second instruction pointer 304 is "2". Since the value of the fetch stage select signal 115 is "1", the second address selector 305 outputs the value of the first instruction pointer 302, "3", as the first address 11. In the instruction register section 101 (FIG. 8), the first instruction register 202 fetches the instruction in the "2"nd location, which is the first instruction 14 of the 3rd cycle. Since the value of the fetch stage select signal 115 is "1", the second instruction register 204 fetches the instruction in the "1"st location output from the first instruction register 202. Since the value of the NOP select signal 114 is "0", the content of the instruction code 111 is the instruction in the "1"st location output from the second instruction register 204.

In the instruction pointer section 103 (FIG. 9) of the second processor 2, the value of the first instruction pointer 302 is "13", and the value of the second instruction pointer 30 4 is "12". Since the value of the fetch stage select signal 115 is "0", the second address selector 305 outputs the value of the first instruction pointer 302, "13", as the second address 12. In the instruction register section 101 (FIG. 8), the first instruction register 202 fetches the instruction in the "11"th location, which is the second instruction 15 of the 3rd cycle. Since the value of the fetch stage select signal 115 is "0", the second instruction register 204 fetches the instruction in the "11"th location output from the first instruction selector 201. Since the value of the NOP select signal 114 is "0", the content of the instruction code 111 is the instruction in the "11"th location output from the second instruction register 204.

In the address select circuit 8 (FIG. 10) of the instruction memory 4, the value of the processor select signal 411 is "1". Accordingly, the value of the second address 12, "12", is output as the first bank address 17, and the value of the first address 11, "3", is output as the second bank address 18. Thus, the first bank 5 outputs an instruction in a "12"th location as a first instruction 14, and the second bank 6 outputs an instruction in a "3"rd location as a second instruction 15.

<5th Cycle>

In the instruction pointer section 103 (FIG. 9) of the first processor 1, the value of the first instruction pointer 302 is "4", and the value of the second instruction pointer 304 is "3". Since the value of the fetch stage select signal 115 is "1", the second address selector 305 outputs the value of the first instruction pointer 302, "4", as the first address 11. In the instruction register section 101 (FIG. 8), the first instruction register 202 fetches the instruction in the "3"rd location, which is the first instruction 14 of the 4th cycle. Since the value of the fetch stage select signal 115 is "1", the second instruction register 204 fetches the instruction in the "2"nd location output from the first instruction register 202. Since the value of the NOP select signal 114 is "0", the content of the instruction code 111 is the instruction in the "2"nd location output from the second instruction register 204.

In the instruction pointer section 103 (FIG. 9) of the second processor 2, the value of the first instruction pointer 302 is "14", and the value of the second instruction pointer 304 is "13". Since the value of the fetch stage select signal 115 is "0", the second address selector 305 outputs the value of the second instruction pointer 304, "13", as the second address 12. In the instruction register section 101 (FIG. 8), the first instruction register 202 fetches the instruction in the "12"th location, which is the second instruction 15 of the 4th cycle. Since the value of the fetch stage select signal 115 is "0", the second instruction register 204 fetches the instruction in the "12"th location output from the first instruction selector 201. Since the value of the NOP select signal 114 is "0", the content of the instruction code 111 is the instruction in the "12"th location output from the second instruction register 204.

In the address select circuit 8 (FIG. 10) of the instruction memory 4 (FIG. 6), the value of the processor select signal 411 is "0". Accordingly, the value of the first address 11, "4", is output as the first bank address 17, and the value of the second address 12, "13", is output as the second bank address 18. Thus, the first bank 5 outputs an instruction in a "4"th location as a first instruction 14, and the second bank 6 outputs an instruction in a "13"th location as a second instruction 15.

<6th and Later Cycles>

The multiprocessor 100 repeats the same operations as those of the 1st cycle through the 5th cycle.

As described above, the first processor 1 uses the first instruction fetch stage F(1), the second processor 2 uses the second instruction fetch stage F(2), whereby the first processor 1 and the second processor 2 each access the first bank 5 and the second bank 6 exclusively.

(Branch Processing of Instructions)

Figure 13:
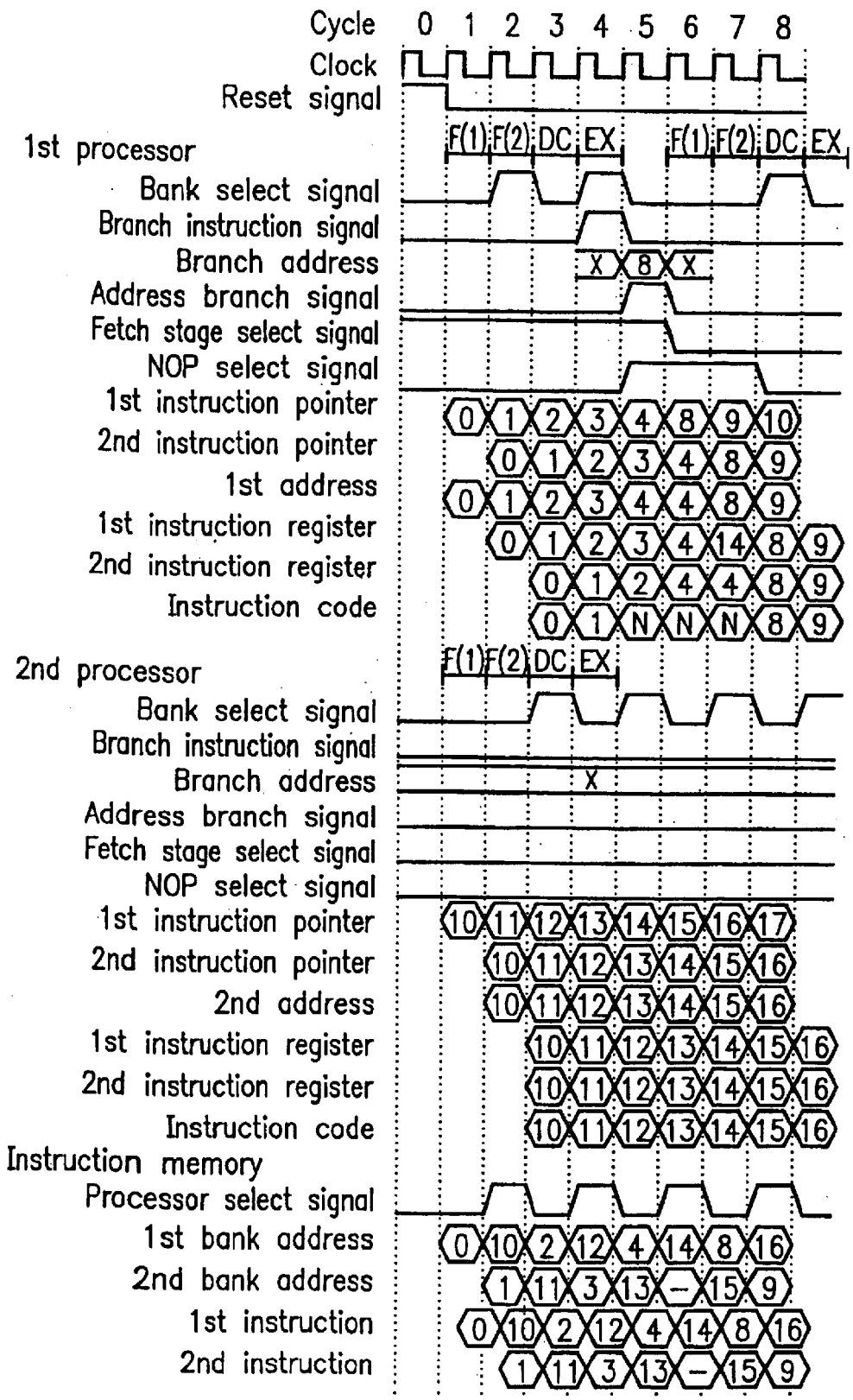
FIG. 13 is a timing chart when the processor performs branch processing according to embodiment 2 of the present invention.

FIG. 13 is a timing chart when the processor of embodiment 2 of the present invention performs branch processing.

Operations of the processor when it performs branch processing of instructions are described with reference to FIG. 13 in conjunction with FIGS. 6 through 11. Each pipeline is a four-stage pipeline similar to that described in the "Sequential processing of instructions" section. It is assumed that the numeric value 522 is "1" for the first processor 1, and the numeric value 522 is "0" for the second processor 2. Furthermore, it is assumed that an instruction in the "1"st location is a branch instruction that directs branching to the "8"th location, and branch processing is performed in the execution stage EX.

<0th through 4th Cycles>

The multiprocessor 100 repeats the same operations as those of the 0th cycle through the 4th cycle described in the "Sequential processing of instructions" section.

<5th Cycle>

The second processor 2 and the address select circuit 8 of the instruction memory 4 operate in the same manner as described in the "Sequential processing of instructions" section.

In the first processor 1 (FIG. 7), a branch instruction in the "1"st location is executed, whereby the value of the branch instruction signal 112 becomes "1". Accordingly, the value of the NOP select signal 114 becomes "1", and the value of the address branch signal 116 becomes "1".

In the instruction pointer section 103 (FIG. 9) of the first processor 1, the value of the first instruction pointer 302 is "4", and the value of the second instruction pointer 304 is "3". Since the value of the fetch stage select signal 115 is "1", the second address selector 305 outputs the value of the first instruction pointer 302, "4", as the first address 11. In the instruction register section 101 (FIG. 8), the first instruction register 202 fetches the instruction in the "3"rd location, which is the first instruction 14 of the 4th cycle. Since the value of the fetch stage select signal 115 is "1", the second instruction register 204 fetches the instruction in the "2"nd location output from the first instruction register 202. Since the value of the NOP select signal 114 is "1", the content of the instruction code 111 is an NOP code 211 (NOP instruction).

<6th Cycle>

In the first processor 1 (FIG. 7), a branch instruction in the "1"st location is executed, whereby the value of the branch address 113 becomes "8". Since the least significant bit of the branch address 113 is "0", the value of the instruction pointer signal 117 is "0", and the value of the address branch signal 116 is "1", the value of the fetch stage select signal 115 accordingly becomes "0". On the other hand, the value of the NOP select signal 114 becomes "1", and the value of the address branch signal 116 becomes "0".

In the instruction pointer section 103 (FIG. 9) of the first processor 1, since the value of the address branch signal 116 is "1", the first address selector 301 outputs the branch address 113. As a result, the value of the first instruction pointer 302 becomes "8", and the value of the second instruction pointer 304 becomes "4". Since the value of the fetch stage select signal 115 is "0", the second address selector 305 outputs the value of the second instruction pointer 304, "4", as the first address 11. In the instruction register section 101 (FIG. 8), the first instruction register 202 fetches the instruction in the "3"rd location, which is the first instruction 14 of the 4th cycle. Since the value of the fetch stage select signal 115 is "0", the second instruction register 204 fetches the instruction in the "4"th location output from the first instruction selector 201. Since the value of the NOP select signal 114 is "1", the content of the instruction code 111 is an NOP code 211 (NOP instruction).

In the instruction pointer section 103 (FIG. 9) of the second processor 2, the value of the first instruction pointer 302 is "15", and the value of the second instruction pointer 304 is "14". Since the value of the fetch stage select signal 115 is "0", the second address selector 305 outputs the value of the second instruction pointer 304, "14", as the second address 12. In the instruction register section 101 (FIG. 8), the first instruction register 202 fetches the instruction in the "13"th location, which is the second instruction 15 of the 5th cycle. Since the value of the fetch stage select signal 115 is "0", the second instruction register 204 fetches the instruction in the "13"th location output from the first instruction selector 201. Since the value of the NOP select signal 114 is "0", the content of the instruction code 111 becomes an instruction in the "13"th location output from the second instruction register 204.

In the address select circuit 8 (FIG. 10) of the instruction memory 4 (FIG. 6), the value of the processor select signal 411 is "1". Accordingly, the value of the second address 12, "14", is output as the first bank address 17, and the value of the first address 11, "4", is outputs as the second bank address 18. Thus, the first bank 5 outputs an instruction in a "14"th location as a first instruction 14, and the second bank 6 outputs an instruction in a "4"th location as a second instruction 15.

<7th Cycle>

In the instruction pointer section 103 (FIG. 9) of the first processor 1, the value of the first instruction pointer 302 is "9", and the value of the second instruction pointer 304 is "8". Since the value of the fetch stage select signal 115 is "0", the second address selector 305 outputs the value of the second instruction pointer 304, "8", as the first address 11. In the instruction register section 101 (FIG. 8), the first instruction register 202 fetches the instruction in the "14"th location, which is the first instruction 14 of the 6th cycle. Since the value of the fetch stage select signal 115 is "0", the second instruction register 204 fetches the instruction in the "14"th location output from the first instruction selector 201. Since the value of the NOP select signal 114 is "1", the content of the instruction code 111 is an NOP code 211 (NOP instruction).

In the instruction pointer section 103 (FIG. 9) of the second processor 2, the value of the first instruction pointer 302 is "16", and the value of the second instruction pointer 304 is "15". Since the value of the fetch stage select signal 115 is "0", the second address selector 305 outputs the value of the second instruction pointer 304, "15", as the second address 12. In the instruction register section 101 (FIG. 8), the first instruction register 202 fetches the instruction in the "14"th location, which is the second instruction 15 of the 6th cycle. Since the value of the fetch stage select signal 115 is "0", the second instruction register 204 fetches the instruction in the "14"th location output from the first instruction selector 201. Since the value of the NOP select signal 114 is "0", the content of the instruction code 111 becomes an instruction in the "14"th location output from the second instruction register 204.

In the address select circuit 8 (FIG. 10) of the instruction memory 4 (FIG. 6), the value of the processor select signal 411 is "0". Accordingly, the value of the first address 11, "8", is output as the first bank address 17, and the value of the second address 12, "15", is output as the second bank address 18. Thus, the first bank 5 outputs an instruction in a "8"th location as a first instruction 14, and the second bank 6 outputs an instruction in a "15"th location as a second instruction 15.

<8th Cycle>

In the instruction pointer section 103 (FIG. 9) of the first processor 1, the value of the first instruction pointer 302 is "10", and the value of the second instruction pointer 304 is "9". Since the value of the fetch stage select signal 115 is "0", the second address selector 305 outputs the value of the second instruction pointer 304, "9", as the first address 11. In the instruction register section 101 (FIG. 8), the first instruction register 202 fetches the instruction in the "9"th location, which is the first instruction 14 of the 7th cycle. Since the value of the fetch stage select signal 115 is "0", the second instruction register 204 fetches the instruction in the "8"th location output from the first instruction selector 201. Since the value of the NOP select signal 114 is "0", the content of the instruction code 111 is the instruction in the "8"th location output from the second instruction register 204.

In the instruction pointer section 103 (FIG. 9) of the second processor 2, the value of the first instruction pointer 302 is "17", and the value of the second instruction pointer 304 is "16". Since the value of the fetch stage select signal 115 is "0", the second address selector 305 outputs the value of the second instruction pointer 304, "16", as the second address 12. In the instruction register section 101 (FIG. 8), the first instruction register 202 fetches the instruction in the "15"th location, which is the second instruction 15 of the 7th cycle. Since the value of the fetch stage select signal 115 is "0", the second instruction register 204 fetches the instruction in the "15"th location output from the first instruction selector 201. Since the value of the NOP select signal 114 is "0", the content of the instruction code 111 is an instruction in the "15"th location output from the second instruction register 204.

In the address select circuit 8 (FIG. 10) of the instruction memory 4 (FIG. 6), the value of the processor select signal 411 is "1". Accordingly, the value of the second address 12, "16", is output as the first bank address 17, and the value of the first address 11, "9", is output as the second bank address 18. Thus, the first bank 5 outputs an instruction in a "16"th location as a first instruction 14, and the second bank 6 outputs an instruction in a "9"th location as a second instruction 15.

<9th and Later Cycles>

The multiprocessor 100 repeats the same operations as those of the 1st cycle through the 8th cycle.

As described above, after the branch instruction has been implemented, the multiprocessor 100 changes the instruction fetch stage employed by the processor 1 from the first instruction fetch stage F(1) through the second instruction fetch stage F(2) in order to fetch a subsequent instruction.

Figure 14:
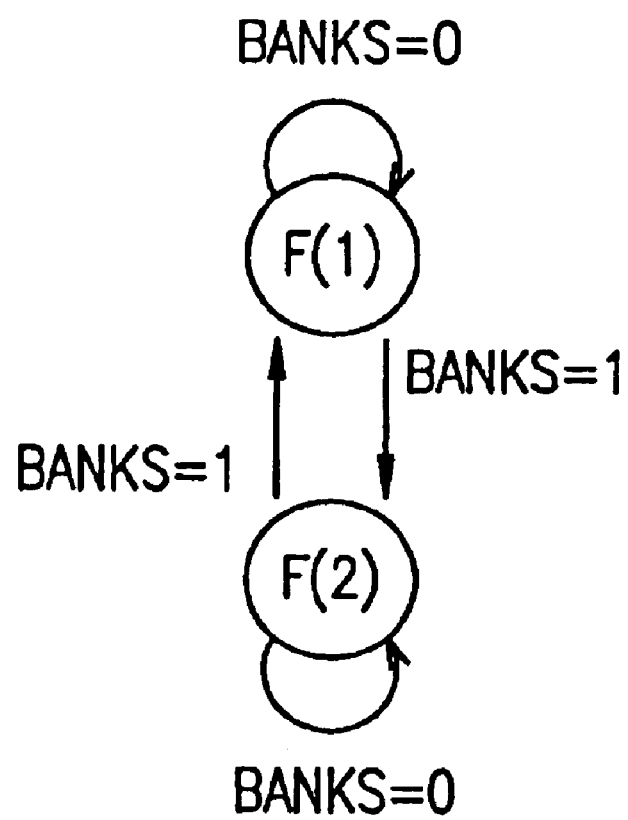
FIG. 14 shows a method for changing instruction fetch stages employed by the processor according to embodiment 2 of the present invention.

FIG. 14 shows a method for changing instruction fetch stages employed in the processor of embodiment 2. In the case where the bank select signal 118 is a bank switch signal BANKS, switching of the instruction fetch stages F(1) and F(2) is performed as shown in FIG. 14. When BANKS=0, the instruction fetch stages are not changed. When BANKS=1, the instruction fetch stages are changed such that F(1) is changed to F(2), or F(2) is changed to F(1).

When an address immediately before a branch point is IP[15:0], and an address immediately after branch point is JIP[15:0], the values of BANKS is determined by, for example, the following source code:

```
if ( IP[0] = = JIP[0] )
then
  BANKS = 1;
else
  BANKS = 0;
```

As described above, the multiprocessor according to embodiment 2 includes the instruction memory 4, and the first and second processors 1 and 2. The instruction memory 4 includes the address select circuit 8, and the first and second banks 5 and 6. The first and second processors 1 and 2 each include the instruction register section 101, the decoder section 102, the instruction pointer section 103, and the control section 104. The first and second processors 1 and 2 each have a pipeline structure including the first instruction fetch stage F(1) and the second instruction fetch stage F(2). The first processor 1 uses the first instruction fetch stage F(1), and the second processor 2 uses the second instruction fetch stage F(2). The first and second processors 1 and 2 are controlled such that each of them accesses the first bank 5 and the second banks 6 exclusively. The first and second processors 1 and 2 are controlled such that, after the branch instruction has been implemented, the instruction fetch stage employed by the processor 1 is changed from the first instruction fetch stage F(1) to the second instruction fetch stage F(2) in order to fetch a subsequent instruction, whereby the instruction memory can be shared by the first and second processors 1 and 2. As a result, it is possible to prevent the occurrence of a conflict between memory accesses of the first and second processors 1 and 2.

It should be appreciated that, although the stages other than the instruction fetch stages are the decoding stage and the execution stage in embodiments 1 and 2, any other type of stage and/or any other structure of stages may be employed for the stages other than the instruction fetch stages. It should also be appreciated that, although the branch operation are performed in the execution stage, the operation may be performed in any other stage. Furthermore, although the processor 1 performs the branch processing in embodiments 1 and 2, any other processor may perform the branch processing.

According to the present invention, in a memory-shared multiprocessor, the necessity for arbitration of a conflict between memory accesses when the conflict occurs is eliminated. Thus, a circuit for the arbitration of the conflict is not necessary, and a standby period due to the conflict arbitration is not required.

Since the standby period due to the conflict arbitration between the memory accesses is not required, it is possible to estimate a run duration of an application. Thus, it is possible to develop an application system without considering that the application system is to run on a multiprocessor, as if it is to run on a single processor. Furthermore, the multiprocessor of the present invention is readily applicable to communication DPSs which require a real time processing because a run duration of an application can be estimated.

Furthermore, according to the present invention, when a processor processes a branch instruction, the processor changes instruction fetch stages, whereby an occurrence of a conflict between memory accesses can be prevented even after the branch instruction has been processed.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A multiprocessor comprising:

M banks provided for storing a plurality of instructions; and

N processors each having N physical instruction fetch stages;

Wherein each of the N processors is configured to process one of the plurality of instructions in a pipelined manner, where N is an integer equal to or greater than 2, and M is an integer equal to or greater than N; and Wherein, in order to fetch instructions output from M banks, each of the N processors uses only one instruction fetch stage among the N instruction fetch stages which is different from instruction fetch stages being used by other ones of the N processors.

2. A multiprocessor according to claim 1, wherein each of the N processors fetches one of the plurality of instructions at one of the N instruction fetch stages, and processes the instruction in a pipelined manner, thereby outputting an address.

3. A multiprocessor according to claim 2, further comprising an address select section for outputting a bank address based on the address output from the each of the N processors.

4. A multiprocessor according to claim 3, wherein each of the M banks outputs one of the plurality of instructions that corresponds to the bank address output from the address select section.

5. A multiprocessor according to claim 1, wherein, when the fetched instruction is a branch instruction, after the branch instruction is processed, the processor changes the instruction fetch stage at which the instruction is fetched from one to another.

6. A multiprocessor according to clam 1, wherein each of the N processors comprising:

an instruction register section that receives one of the plurality of the instructions, a bank select signal, a fetch stage select signal, and an NOP select signal to output an instruction code;

a decoder section that receives the instruction code to output a branch instruction signal and a branch address;

a control section that receives the branch instruction signal, the branch address, and an instruction pointer signal to output the fetch stage select signal, the NOP select signal and an address branch signal; and an instruction pointer section that receives the fetch stage select signal, the address branch signal, and the branch address to output the bank select signal, the instruction pointer signal, and the address.

7. A method for controlling a multiprocessor including M banks storing a plurality of instructions, N processors each having N physical instruction fetch stages and processing one of the plurality of instructions in a pipelined manner, where N is an integer equal to or greater than 2 and M is an integer equal to or greater than N, and an address select section, the method comprising:

A step at which each of the N processors outputs an address of one of the instructions to be processed to the address select section;

A step at which the address select section outputs a blank address to one of the M banks for each address output from the plurality of the N processors;

A step at which each of the M banks outputs one of the plurality of instructions that correspond to the bank address output from the address select section; and A step at which each of the N processors fetches one of the plurality of instructions output from the M banks during at least one of the N physical instruction fetch stages, Wherein none of the N processors, each having the N physical instruction fetch stages, uses all of the N instruction fetch stages.

8. A method for controlling a multiprocessor according to claim 7, wherein, when the fetched instruction is a branch instruction, after the branch instruction is processed, the processor changes the instruction fetch stage at which the instruction is fetched from one to another.

9. A multiprocessor comprising:

M banks provided for storing a plurality of instructions; and

N processors each having N physical instruction fetch stages, wherein each of the N processors is configured to process one of the plurality of instructions in a pipelined manner, N is an integer equal to or greater than 2, and M is an integer equal to or greater than N;

Wherein each of the N processors is allocated to fetch an instruction from a designated one of the M banks, at one physical instruction fetch stage among the N physical instruction fetch stages, and none of the M banks are simultaneously accessed by more than one of the N processors; and Wherein none of the N processors, each having the N physical instruction fetch stages, uses all of the N physical instruction fetch stages.

10. A multiprocessor according to claim 9, wherein each of the N processors includes an instruction register for holding instructions which are conducted by the N processors, and a decoder for decoding instructions which are held by the instruction register.

11. A multiprocessor according to claim 9, wherein when an instruction having been fetched by either one of the N processors is branch instruction after having conducted the branch instruction, the instruction is rendered to change the allocation of fetching an instruction coming from one of the M banks at one of the fetch stages selected from the N instruction fetch stages.

12. A multiprocessor according to claim 9, wherein the pipeline for processing instructions coming from each of the N processors includes an instruction decode stage for decoding the instructions, and an instruction conducting stage for conducting the instructions.

13. A multiprocessor according to claim 9, wherein an instruction constituting an instruction program which is conducted by the multiprocessor is stored within the M banks in an interleaved manner.

14. A multiprocessor comprising:

M banks provided for storing a plurality of instructions; and

N processors each having N physical instruction fetch stages, wherein each of the N processors is configured to process one of the plurality of instructions in a pipelined manner, N is an integer equal to or greater than 2, and M is an integer equal to or greater than N;

Wherein each of the N processors fetches one of the plurality of instructions from an allocated one of the M banks which is not simultaneously accessed by other processors at one of the physical fetch stages;

Wherein none of the processors, each having the N physical instruction fetch stages, uses all of the N physical instruction fetch stages; and wherein allocation of the M banks is in a cyclic fashion from one cycle to the next.

15. A multiprocessor according to claim 14, wherein each of the N processors includes an instruction register for holding instructions which are conducted by the N processors, and a decoder for decoding instructions which are held by the instruction register.

16. A multiprocessor according to claim 14, wherein when an instruction having been fetched by either one of the N processors is a branch instruction, after having conducted the branch instruction, the instruction is rendered to change the allocation of fetching an instruction coming from one of the M banks at one of the fetch stages selected from the N instruction fetch stages.

17. A multiprocessor according to claim 14, wherein a pipeline for processing instructions coming from each of the N processors includes at least an instruction decode stage for decoding the instructions, and an instruction conducting stage for conducting the instructions.

18. A multiprocessor according to claim 14, wherein an instruction constituting an instruction program which is conducted by the multiprocessor is stored within the M banks in an interleaved manner.

* * * * *